US012626352B2

(12) United States Patent (10) Patent No.: US 12,626,352 B2

Rao (45) Date of Patent: May 12, 2026

(54) INSPECTION SYSTEMS AND ASSOCIATED METHODS FOR GAS TURBINE ENGINE COMPONENTS

(71) Applicant: RTX CORPORATION, Farmington, CT (US)

(72) Inventor: Krishna Rao, Sammamish, WA (US)

(73) Assignee: RTX CORPORATION, Farmington, CT (US)

( * ) Notice: Subject to any disclaimer, the term of this patent is extended or adjusted under 35 U.S.C. 154(b) by 275 days.

(21) Appl. No.: 18/435,249

(22) Filed: Feb. 7, 2024

(65) Prior Publication Data

US 2025/0252551 A1 Aug. 7, 2025

(51) Int. Cl.
| | |
|---|---|
| *G06T 7/00* | (2017.01) |
| *F01D 21/00* | (2006.01) |
| *G06T 7/11* | (2017.01) |
| *G06T 7/50* | (2017.01) |
| *G06T 7/62* | (2017.01) |
| *G06T 7/70* | (2017.01) |

(52) U.S. Cl.
CPC .......... *G06T 7/0006* (2013.01); *F01D 21/003* (2013.01); *G06T 7/11* (2017.01); *G06T 7/50* (2017.01); *G06T 7/62* (2017.01); *G06T 7/70* (2017.01); *F05D 2260/81* (2013.01); *F05D 2260/83* (2013.01); *G06T 2207/20081* (2013.01); *G06T 2207/20084* (2013.01); *G06T 2207/30108* (2013.01)

(58) Field of Classification Search
USPC ................................................ 382/141, 155
See application file for complete search history.

(56) References Cited

U.S. PATENT DOCUMENTS

| | | | |
|---|---|---|---|
| 10,445,871 B2 | 10/2019 | Lim et al. | |
| 10,504,220 B2 | 12/2019 | Lim et al. | |
| 10,902,664 B2* | 1/2021 | Xiong | F01D 21/003 |

(Continued)

FOREIGN PATENT DOCUMENTS

| | | |
|---|---|---|
| CN | 111178392 | 5/2020 |
| CN | 113129321 | 7/2021 |

(Continued)

OTHER PUBLICATIONS

European Search Report for European Patent Application No. 25156566.9 mailed May 7, 2025.

*Primary Examiner* — Haris Sabah

(74) *Attorney, Agent, or Firm* — Carlson, Gaskey & Olds, P.C.

(57) ABSTRACT

A system for inspecting a gas turbine engine component may include, among other things, one or more processors collectively operable to execute an inspection environment. The inspection environment may be operable to access image data associated with a gas turbine engine component, evaluate the image data with a machine learning model to identify a shape of at least one cooling feature of the gas turbine engine component, determine a physical dimension associated with the shape, compare the physical dimension to a design dimension of the at least one cooling feature, and generate at least one indicator in response to a difference between the physical dimension and the design dimension meeting at least one criterion. A method for inspecting a gas turbine engine component is also disclosed.

17 Claims, 6 Drawing Sheets

(56) References Cited

U.S. PATENT DOCUMENTS

| | | | | |
|---|---|---|---|---|
| 2018/0283200 | A1* | 10/2018 | Gill ....................... | G01M 15/14 |
| 2022/0236197 | A1* | 7/2022 | Wang .................... | F01D 21/003 |
| 2024/0264092 | A1* | 8/2024 | Lee ..................... | G06F 18/2135 |
| 2024/0344929 | A1* | 10/2024 | Makigano ............. | G01M 13/02 |

FOREIGN PATENT DOCUMENTS

| | | |
|---|---|---|
| EP | 3168808 | 5/2017 |
| EP | 4120189 | 1/2023 |
| WO | 2020119103 | 6/2020 |

* cited by examiner

FIG.9A                    FIG.9B

INSPECTION SYSTEMS AND ASSOCIATED METHODS FOR GAS TURBINE ENGINE COMPONENTS

BACKGROUND

This disclosure relates to inspecting gas turbine engine components.

Various gas turbine engine components may include one or more cooling features for cooling augmentation during engine operation. The cooling features may include cooling holes along a surface of the component to provide film cooling. The component may be manufactured according to a computer-aided design (CAD) model. The as-manufactured component may be physically inspected to determine one or more dimensions, which may be compared to manufacturing tolerances, for determining whether the component passes inspection.

SUMMARY

A system for inspecting a gas turbine engine component may include one or more processors coupled to memory. The one or more processors may be collectively operable to execute an inspection environment. The inspection environment may be operable to access image data associated with a gas turbine engine component. The inspection environment may be operable to evaluate the image data with a machine learning model to identify a shape of at least one cooling feature of the gas turbine engine component. The inspection environment may be operable to determine a physical dimension associated with the shape. The inspection environment may be operable to compare the physical dimension to a design dimension of the at least one cooling feature. The inspection environment may be operable to generate at least one indicator in response to a difference between the physical dimension and the design dimension meeting at least one criterion.

In any implementations, the system may include one or more imaging devices operable to capture imagery of the gas turbine engine component associated with the image data.

In any implementations, the one or more imaging devices may be arranged such that a field of view of the respective one or more imaging devices may be constrained to a profile of the gas turbine engine component.

In any implementations, the at least one cooling feature may include a plurality of cooling holes distributed along an external surface of the gas turbine engine component.

In any implementations, the inspection environment may be operable to fit an oriented bounding box to the plurality of cooling holes. The inspection environment may be operable to determine the physical dimension based on the oriented bounding box.

In any implementations, the at least one cooling feature may include a diffuser along an external surface of the gas turbine engine component.

In any implementations, the gas turbine engine component may include an airfoil.

In any implementations, the inspection environment may be operable to determine the physical dimension of the shape in response to translating an orientation of the shape relative to a stacking axis associated with the airfoil.

In any implementations, the inspection environment may be operable to translate the orientation of the shape such that an axis of a cooling passage associated with the at least one cooling feature projected onto a reference plane may be substantially perpendicular to a projection of the stacking axis onto the reference plane.

In any implementations, the inspection environment may be operable to establish a binary mask associated with the shape. The inspection environment may be operable to determine the physical dimension of the shape based on the binary mask.

In any implementations, the machine learning model may include a neural network.

In any implementations, the neural network may be established based on a supervised training set. The supervised training set may include a virtual model of the gas turbine engine component. The supervised training set may include at least one identifier associated with the respective at least one cooling feature. The supervised training set may include imagery associated with one or more physical instances of the gas turbine engine component.

An inspection system may include imaging means for capturing imagery of a gas turbine engine component. The inspection system may include segmentation means for identifying a shape of at least one cooling feature in the imagery based on machine learning. The inspection system may include evaluation means for comparing a physical dimension of the shape to a design dimension of the at least one cooling feature. The inspection system may include indication means for generating at least one indicator based on a difference between the physical dimension and the design dimension.

In any implementations, the imaging means may be operable to capture imagery of a localized region of the gas turbine engine component including the at least one cooling feature.

In any implementations, the at least one cooling feature may include a diffuser along an external surface of the gas turbine engine component. The gas turbine engine component may include an airfoil.

A method for inspecting a gas turbine engine component may include accessing image data associated with a physical gas turbine engine component. The method may include evaluating the image data with a machine learning model to identify a shape of at least one cooling feature of the physical gas turbine engine component. The method may include determining a difference between the identified shape and a design shape of the at least one cooling feature. The method may include generating at least one indicator in response to determining that the difference meets at least one criterion.

In any implementations, the at least one cooling feature may include at least one diffuser along an external surface of the gas turbine engine component.

In any implementations, the at least one diffuser may include a set of diffusers distributed along the external surface associated with the identified shape. The method may include fitting a first oriented bounding box to a set of diffusers of a virtual model associated with the gas turbine engine component. The method may include fitting a second oriented bounding box to the identified shape. The determining step may include comparing at least one dimension of the first oriented bounding box to at least one dimension of the second oriented bounding box.

In any implementations, the method may include training the machine learning model based on a supervised training set. The supervised training set may include a virtual model of the gas turbine engine component. The supervised training set may include at least one identifier associated with the respective at least one cooling feature. The supervised training set may include one or more physical instances of the gas turbine engine component.

In any implementations, the determining step may include translating an orientation of the shape from a first orientation associated with the image data to a second, different orientation, and then measuring the shape in the second orientation relative to an axis associated with the gas turbine engine component.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
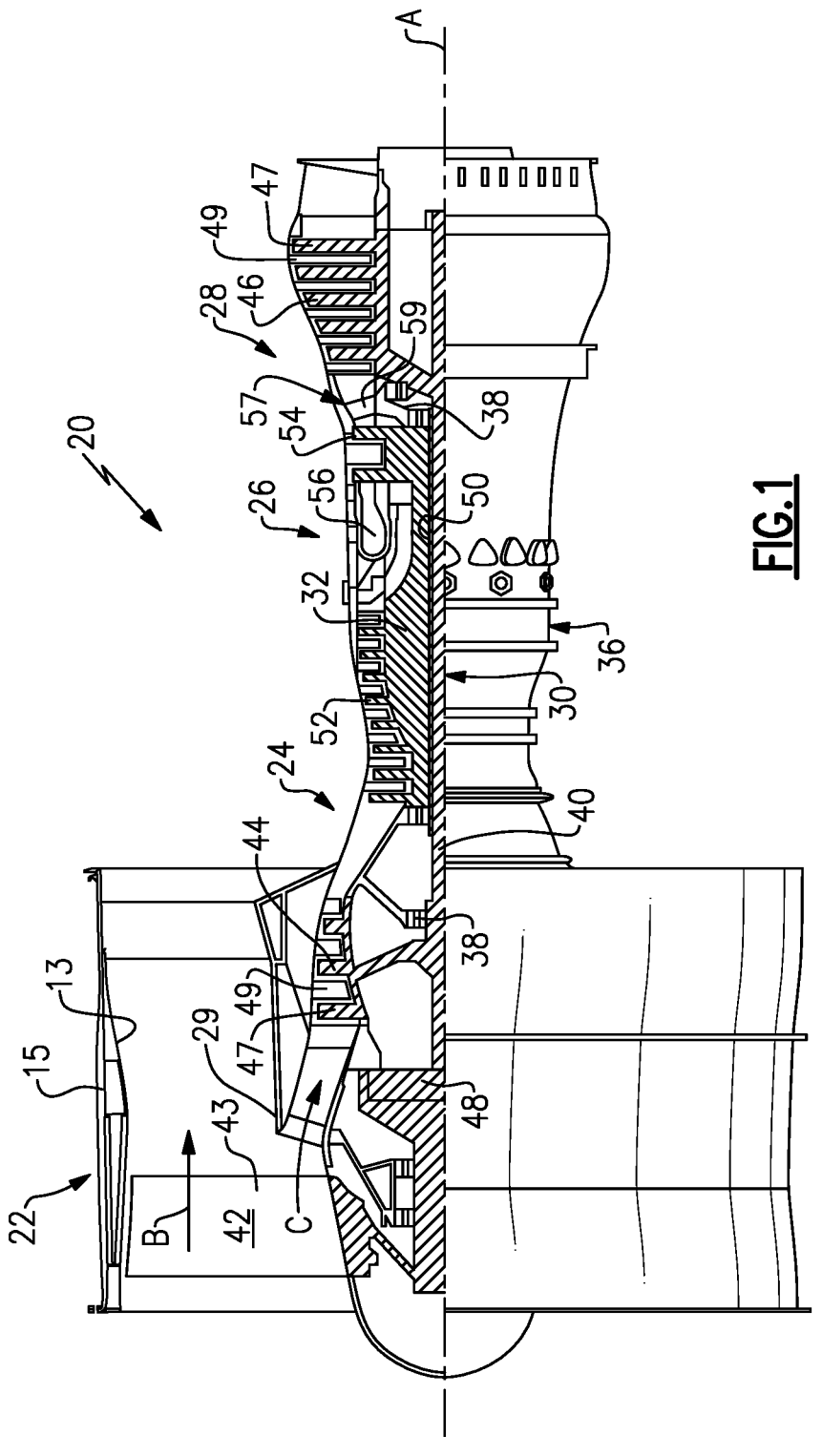
FIG. 1 discloses a gas turbine engine.

The inspection systems and methods disclosed herein may include inspecting one or more features of a gas turbine engine component (e.g., part). The component may include one or more surface features, including cooling features visible on the component. Images of the component may be captured by one or more imaging devices. A field of view of the imaging device may be constrained to a profile of the component, which may reduce complexity in identifying the features. Color and/or other images of the component may be captured by the imaging device(s) in a specific orientation relative to one or more datums associated with the component. The images may be segmented to extract the (e.g., exact) geometry of the cooling feature(s). The images may be segmented using various techniques, such as a machine learning model, to extract the geometry of specific cooling features (e.g., diffusers). The extracted geometry may be utilized to determine one or more attributes and/or characteristics associated with the feature that may be assigned in a respective virtual (e.g., CAD) model, such as an identifier (e.g., name) and/or (e.g., meter hole) vector axis.

The extracted geometry may be measured and compared to the respective design to determine whether the features of the as-manufactured component meet design requirements, including respective design dimension(s). The disclosed systems and methods may use machine learning to measure the shape (e.g., footprint) of the cooling feature(s) in an as-manufactured gas turbine engine component (e.g., airfoil). The cooling features may include diffusers and/or cooling holes arranged to provide film cooling augmentation. The system may be operable to compare the determined shape to the as-designed shape. A machine learning model such as a neural network may be utilized to segment a localized region of the component within a field of view of the camera and may generate a segmented mask for the cooling feature(s). The teachings disclosed herein may be utilized to determine changes over time to cooling features of the same component, which may facilitate identification of blockage, etc.

Supervised and unsupervised training techniques may be utilized. A neural network or other machine learning model may be trained using identifiers (e.g., names) of the cooling features assigned in an associated virtual (e.g., CAD) model to identify the respective features within the images of the training set. The neural network may be trained for a specific part, or it may be trained for a set of different parts. The neural network may be trained with instances of only one part if the identity and/or number of cooling features may be unknown. Training the machine learning model may include presenting the model with different geometries, sizes, positions and/or orientations of as-designed and/or as-manufactured cooling features, including cooling holes and/or diffusers.

In implementations, the component may include an airfoil. The identified shape of the cooling feature(s) in the airfoil may be measured by translating an orientation of the shape relative to an airfoil stacking axis. A dimension such as a width of the translated shape may be measured relative to the axis.

The systems and associated methods disclosed herein may determine whether the measured deviation meet one or more criterion, such as exceeding a preselected threshold (e.g., tolerance band). One or more indicators may be generated in response to the one or more criterion being met. The indicators may be utilized to perform various corrective actions including further inspection of the as-manufactured component and/or the associated manufacturing process.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Various gas turbine engine components may include one or more cooling features for cooling augmentation during engine operation. The cooling features may include cooling holes such as diffusers established along an external (e.g., visible) surface of the component to provide film cooling. Diffusers may serve to diffuse cooling flow communicated by a cooling passage (e.g., meter hole) in the component. The diffuser may include a volume having a cross-sectional profile that may be greater than a minimum cross-sectional profile of the cooling passage. The diffuser may dimensioned to interconnect the cooling passage and an exit port at the external surface of the component. Measuring shaped diffusers and other cooling holes on various gas turbine engine components, including turbine blades and vanes, may present challenges due to variation in the formation process (e.g., casting, machining, additive manufacturing, etc.), surface coatings, etc. Measuring a component by manual techniques may require about forty-five minutes or more to complete. Utilizing the techniques disclosed herein, measurement of cooling features of a component may be accomplished in less than five minutes, which may reduce overall production time.

Figure 2:
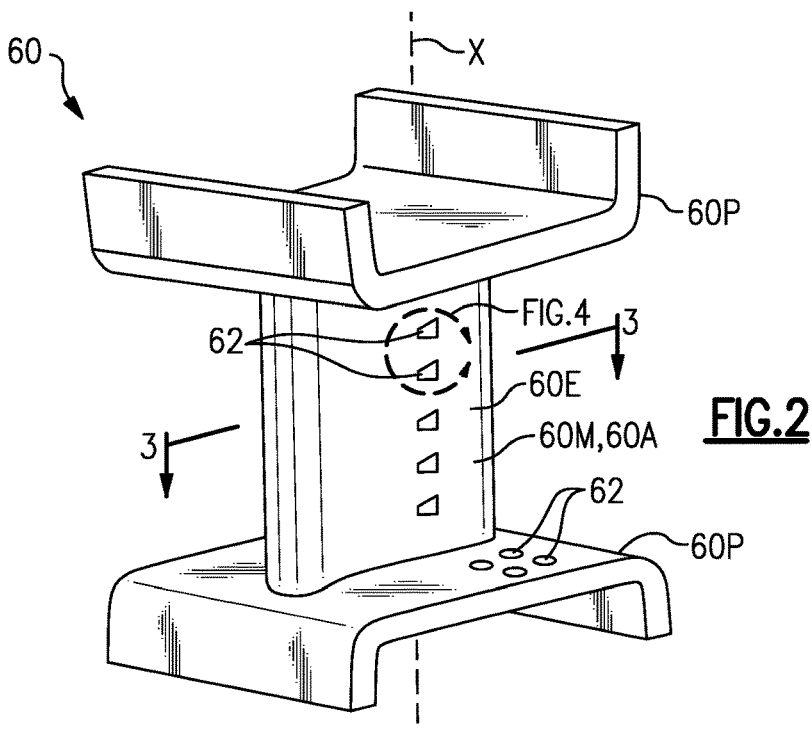
FIG. 2 discloses a perspective view of a gas turbine engine component.
Figure 3:
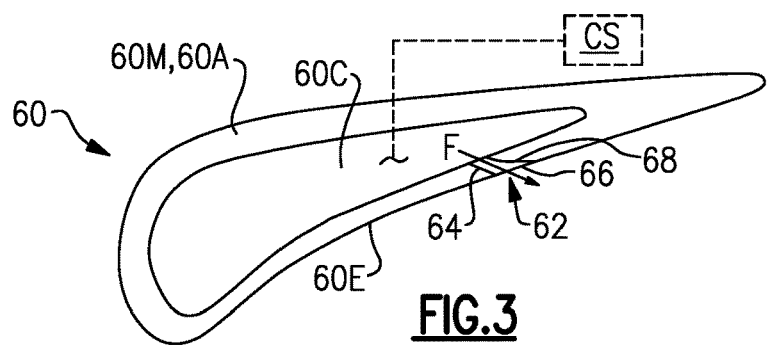
FIG. 3 discloses the component taken along line 3-3 of FIG. 2.

FIG. 2 disclose a gas turbine engine component 60 according to an implementation. The component 60 may include a main body 60M. In implementations, the component 60 may include an airfoil section 60A that may extend from, or between, one or more platform sections 60P. In the implementation of FIG. 2, the component 60 may be a static vane. In other implementations, the component 60 may be a rotatable blade. The component 60 may be incorporated into various sections of the engine 20, such as the turbine section 28. In the implementation of FIG. 3, the component 60 may include at least one internal cavity (e.g., plenum) 60C. The internal cavity 60C may be coupled to a cooling source CS. The cooling source CS may be operable to communicate pressurized cooling flow from various locations of the engine, such as bleed air from the compressor section 24. The main body 60M may extend along a longitudinal (e.g., stacking) axis X. In implementations, the component 60 may be an airfoil include a leading edge, a trailing edge and pressure and suction sides. The airfoil section 60A may extend along the stacking axis X associated with the airfoil from a 0 percent span position to a 100 percent span position. In implementations, the airfoil section 60A may be joined to one of the platform sections 60P at the 0 percent span position. The airfoil section 60A may be joined to another one of the platform sections 60P at the 100 percent span position. In implementations in which the component 60 is a rotatable blade, the 100 percent span position may be established at a free end (e.g., tip) of the airfoil section 60A. Although the description primarily refers to the gas turbine engine component being an airfoil, other components incorporating cooling features may benefit from the teachings disclosed herein, including blade outer air seals (BOAS), combustion panel and liners, etc.

Figure 4:
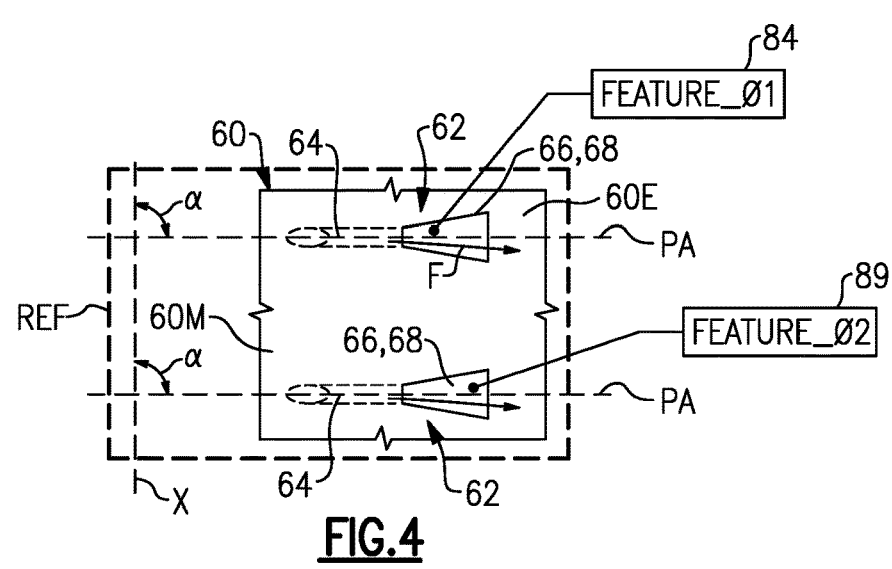
FIG. 4 discloses cooling features along selected portions of the component of FIG. 2.

Referring to FIGS. 3-4, with continuing reference to FIG. 2, the component 60 may include one or more cooling features 62 for providing cooling augmentation to various portions of the component 60. The cooling features 62 may be coupled to the internal cavity 60C. The cooling features 62 may be dimensioned to communicate cooling flow F during operation, including from the internal cavity 60C and/or cooling source CS. In implementations, the component 60 may include a plurality of cooling features 62 distributed along an external surface 60E of the component 60.

Each cooling feature 62 may include a cooling passage 64 and a cooling hole 66. The cooling passage 64 may interconnect the internal cavity 60C and the cooling hole 66. The cooling passage 64 may extend along a respective passage axis PA (FIG. 4). The passage axis PA may be arranged at various angles α relative to the axis X of the component 60 (e.g., when projected onto a common reference plane REF). In implementations, the axes X, PA may be parallel or transverse (e.g., perpendicular or oblique).

The cooling holes 66 may have various geometries, such as elliptical, polygon (e.g., rectangular, trapezoid, etc.) and complex geometries. In the implementation of FIGS. 2-4, the cooling holes 66 may be established by respective diffusers 68. The diffusers 68 may be established along the external surface 60E of the component 60. The diffuser 68 may be dimensioned to widen from the respective cooling passage 64 to the external surface 60E of the component 60 for diffusing the cooling flow F.

Figure 5:
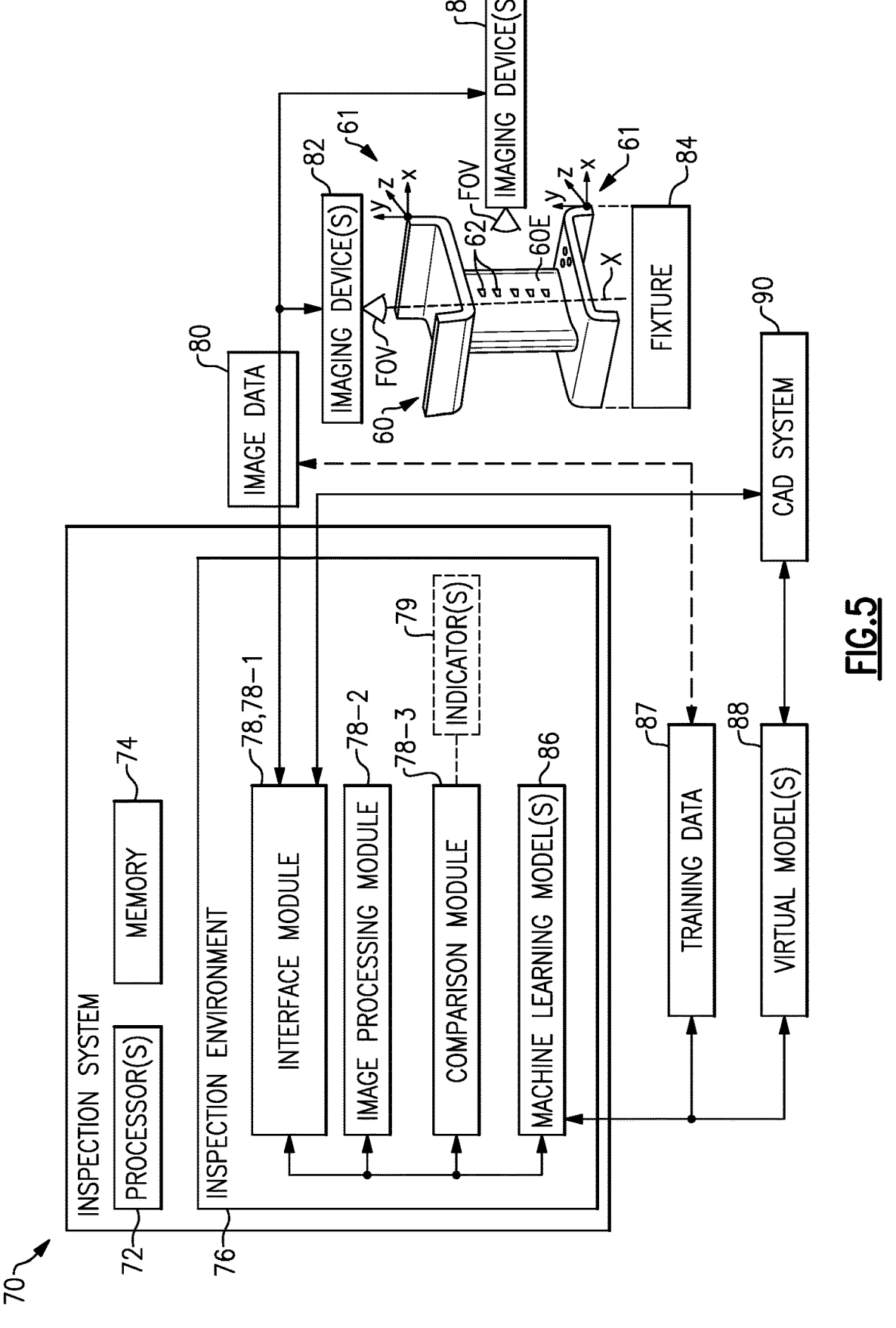
FIG. 5 discloses an inspection system.

Referring to FIG. 5, an inspection system 70 is disclosed. The system 70 may be utilized to inspect various gas turbine engine components, including airfoils and any of the components of the engine 20 (FIG. 1). Although the disclosure primarily refers to the component 60, it should be understood that the teachings disclosed herein are not intended to be limited to the component 60 but may be utilized to inspect gas turbine engine components including various geometries. The system 70 may be operable to use machine learning to identify a geometry of one or more cooling features (e.g., hole, diffuser) in an as-manufactured gas turbine engine component and inspect the physical component by comparing the determined geometry to the corresponding as-designed geometry (e.g., blueprint). The cooling features may be arranged to provide film cooling augmentation to adjacent portions of the component.

The system 70 may include imaging means for capturing imagery of a component, including any of the components disclosed herein. The imaging means may be operable to capture imagery of a localized region of the gas turbine engine component including the cooling feature(s). The localized region may be established along an external surface of the component. The system 70 may include segmentation means for identifying a shape of at least one cooling feature in the imagery based on machine learning. The cooling features may include one or more diffusers and/or cooling holes along the external surface. The system 70 may include evaluation means for comparing a physical dimension of the identified shape(s) to design dimension(s) of the respective cooling feature(s). The system 70 may include indication means for generating at least one indicator based on difference(s) between the physical dimension(s) and the design dimension(s) meeting one or more criterion, including any of the criterion disclosed herein. The means may be established based on any of the features disclosed herein.

The system 70 may include one or more computing device(s) operable to execute an inspection environment 76. The computing device may include one or more computer processors 72, memory 74, storage means, network devices, input and/or output devices, and/or interfaces. The processor(s) 72 may be coupled to the memory 74. The computing device may be operable to execute one or more software programs, including one or more portions of the inspection environment 76. The computing device may be operable to communicate with one or more networks established by one or more computing devices. The memory may include UVPROM, EEPROM, FLASH, RAM, ROM, DVD, CD, a hard drive, or other computer readable medium which may store data and/or the functionality of this description. The computing device may be a desktop computer, laptop computer, smart phone, tablet, or any other computer device. Input devices may include a keyboard, mouse, touchscreen, etc. The output devices may include a monitor, speakers, printers, etc. Each computing device may include one or more processors 72 coupled to memory 74. The processor(s) 72 may be collectively operable to execute the inspection environment 76.

The inspection environment 76 may include one or more modules 78 operable to provide the disclosed functionality. In implementations, the modules 78 may include a first (e.g., interface) module 78-1, a second (e.g., image processing) module 78-2, and/or a third (e.g., comparison) module 78-3. Although three modules 78 are disclosed, the inspection environment 76 may include fewer or more than three modules (e.g., only one module) to provide the disclosed functionality.

The interface module 78-1 may be operable to access image data 80 associated with gas turbine engine component(s) 60. In implementations, the system 70 may include, or may otherwise interface with, one or more imaging devices 82. The imaging device(s) 82 may be operable to capture imagery of the component(s) 60 associated with the image data 80. Various imagery may be utilized, including grayscale and/or color images. Various imaging devices 82 may be used, including contact and/or non-contact profile measurement systems such as a three-dimensional (3D) optical profiler. The interface module 78-1 may be operable to generate one or more signals for commanding the imaging device 82 to acquire imagery of the component 60. The component 60 may be releasably secured in a fixture 84. The imaging device(s) 82 may be arranged at various positions and/or orientations relative to the component 60 and/or fixture 84. The imaging device(s) 82 may be operable to generate one or more images of the component 60 in a specific orientation relative to one or more datums 61. The datums 61 may be established with respect to various geometric features and/or coordinates of the component 60 and/or fixture 84. The imaging device(s) 82 may be arranged such that a field of view FOV of the respective imaging device 82 may be constrained to a profile of the component 60. In implantations, the imaging device 82 may be arranged along a longitudinal (e.g., stacking) axis X of the component 60. Another imaging device 82 may be arranged perpendicular or otherwise transverse to the axis X.

The image processing module 78-2 may be operable to segment or otherwise evaluate the image data 80 to identify a shape of individual cooling features 62 and/or a set of cooling features 62 associated with the image data 80. Various techniques may be utilized to identify the shape(s) of the cooling feature(s) 60.

The physical component 60 may be associated with one or more virtual models 88 that may establish a design (e.g. blueprint) of the component 60. The virtual model 88 may be generated by a CAD system 90 (e.g., CATIA, AutoCAD, Solidworks, Siemens NX, etc.). The virtual model 88 may include a (e.g., design) representation of the physical component 60. The virtual model(s) 88 may include one or more attributes associated with the geometry of the component 60. The attributes may include various identifiers (e.g., names), dimensions, tolerances, etc. Each cooling feature 62 may be assigned attributes including a respective identifier and/or one or more dimensions (e.g., identifiers 89 of FIG. 4). The attributes may be assigned to one or more coordinates of a virtual representation of the respective cooling feature 62 in the virtual model 88. The physical component 60 may be manufactured based on the geometry and any associated attributes specified by the virtual model 88.

The inspection environment 76 may include various artificial intelligence (AI) functionality for inspecting various cooling features 62 and/or other aspects of the gas turbine engine component 60. In implementations, the inspection environment 76 may include, or may otherwise interface with, one or more machine learning models 86. In implementations, the image processing module 78-2 may be operable to evaluate the image data 80 with the machine learning model 86 to identify the shape of the cooling features 62. The machine learning model 86 may be operable to segment the imagery to determine or otherwise infer the (e.g., exact) geometry of the cooling feature(s) 62 established in the as-manufactured component 60. Various machine learning models may be utilized. In implementations, the machine learning model 86 may include a neural network. The machine learning model 86 may be associated with training data 87. The model 86 may be trained utilizing various supervised and/or unsupervised techniques based on the training data 87.

Figure 6:
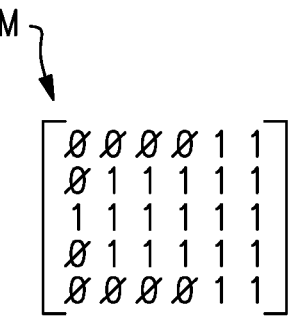
FIG. 6 discloses a mask associated with a shape of a feature of a gas turbine engine component.

The image processing module 78-2 may be operable to establish (e.g., binary) mask(s) associated with the identified shape(s). The binary mask may include a two-dimensional array of binary values that may be set based on the position of the shape in the image data 80, as illustrated by the mask M of FIG. 6 (e.g., 1 for present and 0 for not present at respective coordinate). The image processing module 78-2 may be operable to normalize the binary mask to the datum(s) 61. The comparison module 78-3 may be operable to determine the physical dimension(s) of the identified shape(s) based on the binary mask(s), which may include comparing the mask values to a design (e.g., known) position of the respective passage axis PA (e.g., FIG. 4). The identified shape may include a perimeter. The perimeter and/or area (e.g., footprint) of the identified shape may be utilized to determine the dimension(s) and/or any deviation between the physical dimension(s) and associated design dimension(s).

Figure 7:
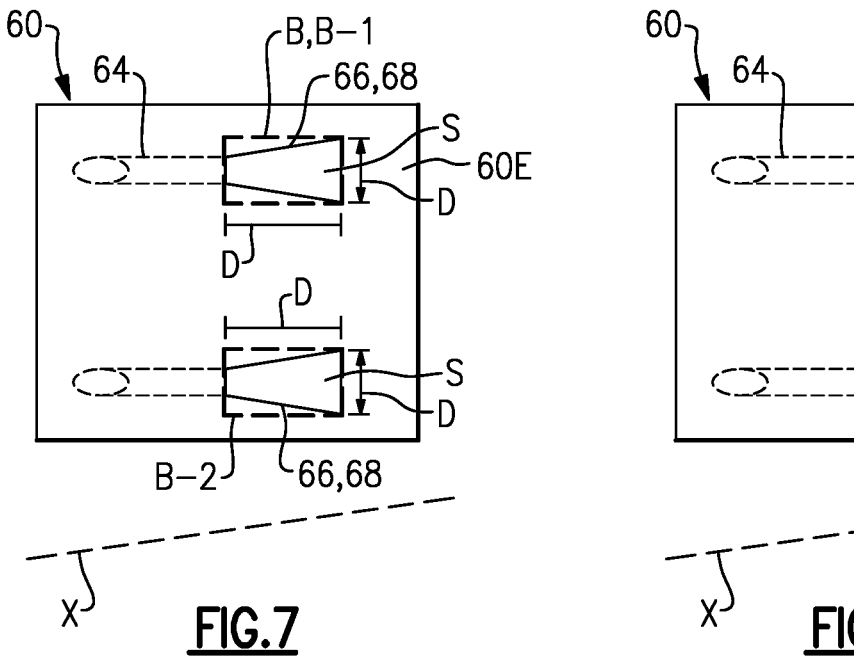
FIG. 7 discloses a set of boundaries fit to features of the component of FIG. 5.
Figure 8:
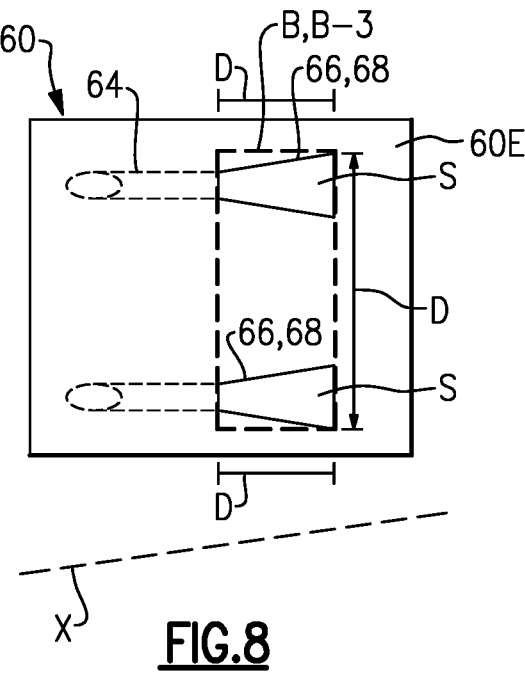
FIG. 8 discloses a boundary fit to a set of features of the component of FIG. 5.

Referring to FIGS. 7-8, with continuing reference to FIG. 5, the image processing module 78-2 may be operable to establish a boundary B relative to one or more identified shapes S. The boundary B may be an oriented bounding box (OBB). The image processing module 78-2 may be operable to fit an OBB to the identified shape S and/or a group of identified shapes S, which may be established in a localized region of the component 60 captured in the image data 80. In implementations, the image processing module 78-2 may be operable to fit OBB(s) to the identified shape(s) of individual cooling holes 66 and/or diffusers 68 (e.g., boundaries B-1, B-2 of FIG. 7) and/or an OBB to two or more cooling holes 66 and/or diffusers 68 which may be adjacent to each other along the external surface 60E of the component 60 (e.g., boundary B-3 of FIG. 8). The comparison module 78-3 may be operable to determine the physical dimension(s) of the cooling feature(s) 62 based on the respective OBB. The geometry of the cooling features 62 in FIGS. 7-8 may be associated with respective binary masks. The OBB may be fit to the binary mask values.

The comparison module 78-3 may be operable to determine feature(s) of the virtual model 88 associated with the identified geometry of the as-manufactured component 60. The comparison module 78-3 may be operable to identify respective cooling feature(s) of the virtual model 88 corresponding to the shape S of the cooling feature(s) 62 identified in the image data 80. Various techniques may be utilized to identify the respective cooling feature(s) of the virtual model 88. In implementations, the comparison module 78-3 may be operable identify the corresponding cooling feature(s) of the virtual model 88 based on coordinates associated with the identified shape S with respect to the datum(s) 61 (FIG. 5). The coordinate sets of the virtual model 88 and the imagery of the as-manufactured component 60 may be normalized with respect to the datum(s) 61.

The comparison module 78-3 may be operable to determine or otherwise access one or more, or any and all, attributes and/or characteristics assigned to the corresponding features in the virtual model 88. The comparison module 78-3 may be operable to access one or more attributes and/or characteristics assigned to the design features in the virtual model 88 that may correspond to the identified cooling features 62 of the physical component 60. The attributes and characteristics may include any of those disclosed herein such as one or more identifiers (e.g., names), shapes, dimensions, tolerances, axes, coordinates, datums, materials, etc. In implementations, the comparison module 78-3 may be operable to determine the identifier (e.g., name) and/or passage axis PA in the virtual model 88 of the design feature associated with the identified cooling feature 62.

The machine learning model 86, including a neural network, may be established based on training data 87 including a supervised and/or unsupervised training set. The training set may include the virtual model 88 of the gas turbine engine component 60, at least one identifier associated with the respective cooling feature(s) 62, and/or imagery associated with one or more physical (e.g., as-manufactured) instances of the component 60. Supervision may include indicating whether the machine learning model 86 correctly or incorrectly identifies the cooling feature(s) 62 and/or associated shape in the imagery. The model 86 may be assigned a confidence score based on correctly or incorrectly identifying the cooling feature(s) 62 and/or associated shape in the imagery. The model 86 may be open or closed. Validated data of inspected components 60 may be utilized to supplement the training data 87, which may improve the accuracy of identifying the cooling features in imagery of subsequently manufactured components 60.

The comparison module 78-3 may be operable to compare geometry and other aspects of a physical (e.g., as-manufactured) component 60 to the associated design. The comparison module 78-3 may be operable to compare one or more attributes and/or characteristics of geometric feature(s) of the physical component 60 to one or more related attributes and/or characteristics for geometric (e.g., design) feature(s) of a virtual design associated with the physical component 60, including any of the geometric features disclosed herein such as cooling features 62 (e.g., diffusers) established in the component 60.

The comparison module 78-3 may be operable to determine one or more physical dimensions D associated with the shape S of one or more cooling features 62 captured in the image data 80 associated with the imagery (e.g., FIGS. 7-8). The comparison module 78-3 may be operable to compare the physical dimension(s) D of the shape S to one or more respective design dimensions of the cooling feature(s) 62, which may be specified by the virtual model 88. The dimensions D may include a width, length, area, volume, position, orientation, etc. associated with the individual cooling feature 62 and/or a (e.g., selected) set of the cooling feature 62, which may be established in a localized region of the component 60. The dimension D may be taken with respect to a (e.g., passage) axis PA of the respective cooling feature 62. Since the identified shape S of the diffuser 68 may be aligned relative to a (e.g., stacking) axis X associated with the (e.g., airfoil) component 60, minimum and maximum pixel values of the respective pixel array (e.g., mask) may be taken in a direction of the axis X from the pixel array of the associated mask (e.g., dimension $D_I$ of FIG. 9A). A pixel distance may be calculated and converted into a real distance for determining the dimension D.

Figure 9:
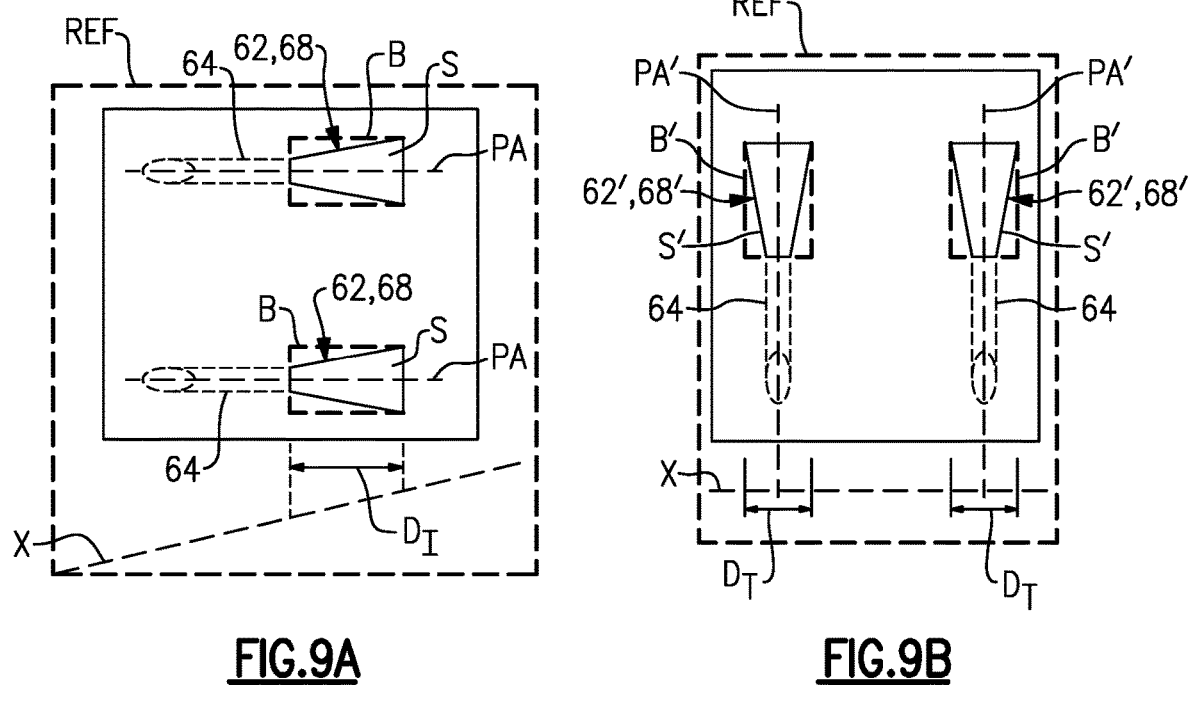
FIG. 9A discloses a dimension associated with a shape of a feature of FIG. 7.
FIG. 9B discloses a dimension associated with a translation of the shape of FIG. 9A.

Referring to FIGS. 9A-9B, with continuing reference to FIG. 5, the image processing module 78-2 may be operable to determine the physical dimension of the identified shape S associated with the cooling feature(s) 62 in response to translating an orientation of the identified shape S and/or an associated boundary B relative to the axis X associated with the component 60. In implementations, the image processing module 78-2 may be operable to translate the shape S and/or associated boundary B from a first position (e.g., FIG. 9A) to a second position associated with the translated shape S' (e.g., FIG. 9B). A projection of the passage axis PA of the cooling passage 64 may be parallel or oblique to a projection of the axis X onto a reference plane REF (e.g., FIG. 9A). The image processing module 78-2 may be operable to translate the orientation of the identified shape S such that the projection of the passage axis PA may be substantially perpendicular to the projection of the axis X (e.g., FIG. 9B). The translated shape S' may have the same size and geometry but may differ in orientation from the identified shape S' relative to the axis X. Various techniques may be utilized to translate the identified shape S and/or associated boundary B. In implementations, the image processing module 78-2 may be operable to transform a (e.g., binary) mask of the identified shape S associated with the first orientation to establish a translated mask associated with the second orientation. Although the shapes in FIGS. 9A-9B are depicted with the geometry of the cooling features 62, the geometry may be representative of respective (e.g., binary) masks.

The comparison module 78-3 may be operable to determine physical dimension(s) D of the translated shape S' and/or an associated boundary B' of the cooling feature 62' relative to the axis X (e.g., dimension Dr of FIG. 9B). The physical dimensions D may include a width of the translated shape S' and/or boundary B' relative to the axis X. The width may correspond to an axial distance along the axis X. Instead of determining the furthest distances of the identified shape S that may be perpendicular to a vector of the passage axis PA, the identified image may be rotated or otherwise translated such that the passage axis PA may be perpendicular to the axis X. Minimum and maximum pixel values of the pixel array of the translated shape S' may be taken in a direction of the axis X from the pixel array of the associated mask (e.g., span of the shape S' relative to the axis X). A pixel distance may be calculated and converted into a real distance. The disclosed measurement techniques may significantly reduce computational complexity.

The comparison module 78-3 may be operable to generate one or more indicators 79 based on a comparison between one or more of the attributes and/or characteristics of the physical component 60 and virtual model 88. The comparison module 78-3 may be operable to generate the indicators 79 in response to a difference between the physical dimension and the design dimension meeting one or more criterion. The criterion may include manufacturing tolerances and/or other manufacturing (e.g., quality) parameters specified by the attributes of the component design. In implementations, the comparison module 78-3 may be operable to generate the indicator 79 in response to the difference exceeding one or more manufacturing tolerances. The comparison module 78-3 may be operable to generate the indicator(s) 79 in response to determining that the measured deviation exceeds a preselected threshold (e.g., tolerance band). The preselected threshold may be associated with one or more attributes, such as manufacturing tolerance.

Figure 10:
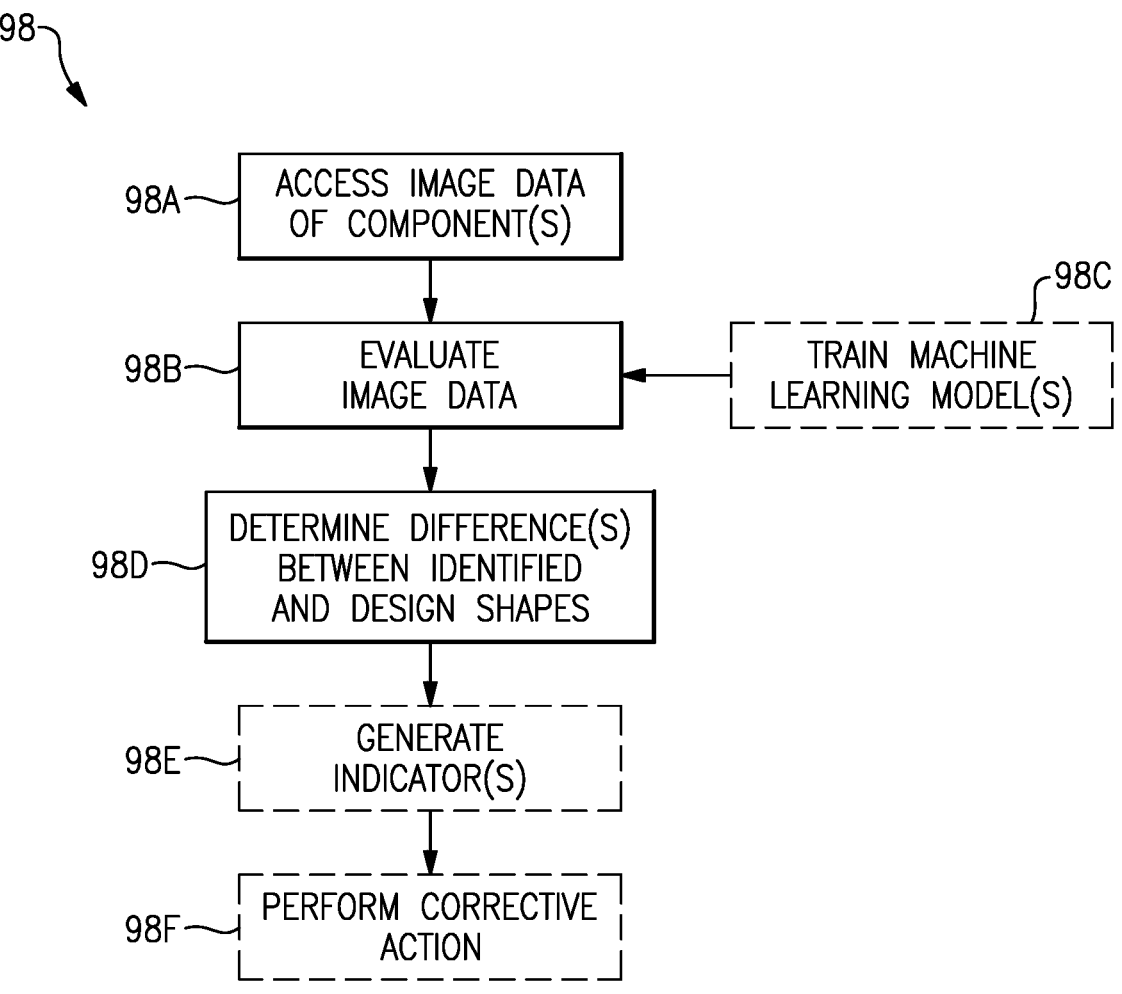
FIG. 10 discloses a method of inspecting gas turbine engine components.

FIG. 10 discloses a method in a flowchart 98 for inspecting gas turbine engine components according to an implementation. The method 98 may be utilized to inspect various physical (e.g., as-manufactured) gas turbine engine components, including any of the components and associated features disclosed herein, such as the component 60 and/or any of the components of the engine 20. Fewer or additional steps than are recited below could be performed within the scope of this disclosure, and the recited order of steps is not intended to limit this disclosure. The inspection environment 76 may be programmed with logic for performing the method 98. Reference is made to the component 60 and inspection system 70 for illustrative purposes.

Referring to FIG. 5, with continuing reference to FIG. 10, at block 98A image data 80 may be accessed. The image data 80 may be associated with a physical (e.g., as manufactured) gas turbine engine component, including any of the components disclosed herein such as the component 60. The component 60 may include one or more cooling features 62. In implementations, the cooling feature 62 may include at least one diffuser 68 along the external surface 60E of the component 60. The image data 80 may capture a shape, position, orientation and/or other aspects of the cooling features 62. In implementations, block 98A may include acquiring imagery of the component 60 and associated cooling features 62. Block 98A may include commanding one or more imaging devices 82 to acquire the imagery. The imaging devices 82 may be arranged such that a field of view FOV of the respective imaging device 82 may be constrained to a profile of the component 60. The image data 80 may be normalized with respect to one or more datums 61, which may be established with respect to various geometric features and/or coordinates of the component 60 and/or an associated fixture 84. Block 98A may include capturing one or more images at different relative positions between the component 60 and imaging device(s) 82. Step 98A may include rotating or otherwise moving the component 60 relative to the imaging devices 82. The images may include overlapping regions of the component 60.

At block 98B, the image data 80 may be evaluated for determining one or more characteristics of the component 60, including various physical dimensions of the cooling features 62. In implementations, block 98B may include evaluating the image data 80 with one or more machine learning models 86 to identify a shape of one or more cooling feature(s) 62 of the physical component 60.

Block 98B may include training the machine learning model(s) 86. Various techniques may be utilized to train the model 86, including any of the techniques disclosed herein. In implementations, block 98C may include training the machine learning model 86 based on training data 87, which may include supervised and/or unsupervised training set(s). The training set may include various characteristics and/or attributes, including any of those disclosed herein, such as one or more design and/or physical positions, orientations, dimensions, tolerances, etc., associated with the component 60. The supervised training set may include a virtual model 88 of the gas turbine engine component 60, at least one identifier (e.g., name) associated with the respective cooling feature 62, and/or one or more physical (e.g., as-manufactured) instances of the component 60.

At block 98D, one or more differences between the identified physical shape(s) and design shape(s) of the cooling feature(s) 62 may be determined, including differences in size, position, orientation, etc. The differences may be determined utilizing any of the techniques disclosed herein.

Block 98D may include translating an orientation of the identified shape of the cooling feature(s) 62 from a first orientation associated with the image data 80 to a second, different orientation. Block 98D may include measuring the translated shape in the second orientation relative to a reference, such as a (e.g., stacking) axis X associated with the component 60.

In implementations, the component 60 may include a set of diffusers 68 distributed along the external surface 60E. The identified shape may be associated with the set of diffusers 68. A virtual boundary, such as a (e.g., first) oriented bounding box, may be fit to a set of diffusers of a virtual model 88 associated with the component 60. The virtual boundary may be assigned any attributes and/or characteristics of diffusers or other cooling features within the virtual boundary, which may be stored in the virtual model 88, which may reduce processing time for inspecting different physical instances of the same component 60. Determining the difference(s) at block 98D may include fitting a boundary, such as a (e.g., second) oriented bounding box to the identified shape of the diffusers 68 in the image data 80. At least one (e.g., design) dimension of the first oriented bounding box may be compared to at least one (e.g., physical) dimension of the second oriented bounding box, including any of the dimensions disclosed herein.

At block 98E, one or more indicator 79 may be generated in response to determining that the difference(s) between the identified physical shape(s) and design shape(s) of the cooling feature(s) 62 meet at least one, or more than one, criterion. The criterion may be predefined and may include any of those disclosed herein.

At block 98F, one or more corrective actions may be performed based on the indicator(s) 79. The corrective actions may include further inspection of the as-manufactured component 60 and/or the associated manufacturing process, including machinery, etc.

The disclosed systems and methods may be utilized to automate the inspection of various features of physical (e.g., as-manufactured) gas turbine engine components, including diffusers and other cooling features established in an exterior of airfoils and other components. A field of view of the imaging device capturing imagery may be limited to the component, which may reduce complexity in identifying the features. Machine learning may be utilized to measure a shape of the cooling feature in the as-manufactured component and compare the determined shape to the as-designed shape. This may reduce the need for an operator to manually measure the feature with a microscope and record their measurement. The identified shape may be measured by translating the identified shape relative to a reference of the component, such as an airfoil stacking axis, and then measuring the translated shape, which may significantly reduce computational complexity. A relatively more accurate representation of the diffuser or other cooling feature may be determined utilizing a machine learning model that may be trained with a training set. Measurements may be determined using one or more mathematical relationships, rather than by eyesight on a microscope. The disclosed techniques may reduce the cycle time for inspection and overall manufacturing time, including reducing the need for reinspection of the part to manually determine where the cooling feature is captured in an image of the part.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A system for inspecting a gas turbine engine component comprising:
   one or more processors coupled to memory, the one or more processors collectively operable to execute an inspection environment, and the inspection environment operable to:
   access image data associated with a gas turbine engine component;
   evaluate the image data with a machine learning model to identify a shape of at least one cooling feature of the gas turbine engine component;
   determine a physical dimension associated with the shape;
   compare the physical dimension to a design dimension of the at least one cooling feature; and
   generate at least one indicator in response to a difference between the physical dimension and the design dimension meeting at least one criterion.

2. The system as recited in claim 1, further comprising:
   one or more imaging devices operable to capture imagery of the gas turbine engine component associated with the image data.

3. The system as recited in claim 2, wherein:
   the one or more imaging devices are arranged such that a field of view of the respective one or more imaging devices is constrained to a profile of the gas turbine engine component.

4. The system as recited in claim 1, wherein the at least one cooling feature includes a plurality of cooling holes distributed along an external surface of the gas turbine engine component.

5. The system as recited in claim 4, wherein the inspection environment is operable to fit an oriented bounding box to the plurality of cooling holes, and the inspection environment is operable to determine the physical dimension based on the oriented bounding box.

6. The system as recited in claim 1, wherein the at least one cooling feature includes a diffuser along an external surface of the gas turbine engine component.

7. The system as recited in claim 1, wherein the gas turbine engine component includes an airfoil.

8. The system as recited in claim 7, wherein the inspection environment is operable to determine the physical dimension of the shape in response to translating an orientation of the shape relative to a stacking axis associated with the airfoil.

9. The system as recited in claim 8, wherein the inspection environment is operable to translate the orientation of the shape such that an axis of a cooling passage associated with the at least one cooling feature projected onto a reference plane is substantially perpendicular to a projection of the stacking axis onto the reference plane.

10. The system as recited in claim 1, wherein the inspection environment is operable to:

establish a binary mask associated with the shape; and determine the physical dimension of the shape based on the binary mask.

11. The system as recited in claim 1, wherein the machine learning model includes a neural network.

12. The system as recited in claim 11, wherein the neural network is established based on a supervised training set including a virtual model of the gas turbine engine component, at least one identifier associated with the respective at least one cooling feature, and imagery associated with one or more physical instances of the gas turbine engine component.

13. A method for inspecting a gas turbine engine component comprising:

accessing image data associated with a physical gas turbine engine component;

evaluating the image data with a machine learning model to identify a shape of at least one cooling feature of the physical gas turbine engine component;

determining a difference between the identified shape and a design shape of the at least one cooling feature; and generating at least one indicator in response to determining that the difference meets at least one criterion.

14. The method as recited in claim 13, wherein the at least one cooling feature includes at least one diffuser along an external surface of the gas turbine engine component.

15. The method as recited in claim 14, wherein the at least one diffuser includes a set of diffusers distributed along the external surface associated with the identified shape, and further comprising:

fitting a first oriented bounding box to a set of diffusers of a virtual model associated with the gas turbine engine component;

fitting a second oriented bounding box to the identified shape; and wherein the determining step includes comparing at least one dimension of the first oriented bounding box to at least one dimension of the second oriented bounding box.

16. The method as recited in claim 13, further comprising:

training the machine learning model based on a supervised training set; and wherein the supervised training set includes a virtual model of the gas turbine engine component, at least one identifier associated with the respective at least one cooling feature, and one or more physical instances of the gas turbine engine component.

17. The method as recited in claim 13, wherein the determining step includes translating an orientation of the shape from a first orientation associated with the image data to a second, different orientation, and then measuring the shape in the second orientation relative to an axis associated with the gas turbine engine component.

* * * * *